United States Patent [19]

Bassett

[11] 3,976,101

[45] Aug. 24, 1976

[54] AUTOMATIC TIMER DEVICE FOR WATER SOFTENERS OR THE LIKE

[76] Inventor: Ronald M. Bassett, 2107 Summerdale, Chicago, Ill. 60625

[22] Filed: Jan. 12, 1976

[21] Appl. No.: 648,148

[52] U.S. Cl. .......................... 137/624.2; 137/624.15; 210/138; 74/2

[51] Int. Cl.[2] .................... G05B 19/06; G04C 23/26

[58] Field of Search .................. 137/624.13, 624.15, 137/624.18, 624.2, 624.12; 74/2; 210/138

[56] References Cited

UNITED STATES PATENTS

| | | | |
|---|---|---|---|
| 3,480,041 | 11/1969 | Whitlock | 137/624.2 |
| 3,482,604 | 12/1969 | Fleckenstein | 137/624.2 |
| 3,708,068 | 1/1973 | Tinkler | 137/624.2 X |
| 3,780,766 | 12/1973 | Link | 137/624.2 |

*Primary Examiner*—Alan Cohan
*Attorney, Agent, or Firm*—Donnie Rudd

[57] ABSTRACT

An automatic timer device is disclosed, useful for turning on and off a valve in an automatic system, such as a water softener, and being adapted to be programmed for an automatic operation over an extended period of time.

12 Claims, 7 Drawing Figures

AUTOMATIC TIMER DEVICE FOR WATER SOFTENERS OR THE LIKE

BACKGROUND OF THE INVENTION

1. Field of the Invention

This invention relates to an automatic timing device useful in water softeners and other such systems where an automatic timing and programmed operation is required.

2. Description of the Prior Art

Many different types of devices have been used for automatic timing in water softeners and the like. All of these systems are very complex and have numerous difficulties. None of the prior systems have foolproof indexing of calendar wheels to set time. None of the systems have really good design equiped to prevent jamming and consequent breakage. None of the systems have a really effective method of engagement override and automatic or manual initiation. Additionally, all the prior systems that accomplished the desired features in water softening timers are bulky and do not have a linear type design which is desirable for styling and setting.

One of the first prior devices was disclosed in U.S. Pat. No. 1,868,801, but this system was, in reality, little more than a motor with a set of gears which closed successive electrical contacts to activate a succession of solenoid valves. The automation of water valve systems developed from that point on and was not strictly confined to the area of lawn sprinklers. In fact, much of the development was in systems for treating or softening water wherein the need to provide a programming over a long interval of time was precisely the same as in lawn sprinkling systems. In 1933, U.S. Pat. No. 1,937,324 disclosed a system for water treatment wherein a plurality of gears were moved by a motor and were actuated by a wheel keyed into a gear system and having rising pins thereon to contact the lever and move the gears into place. This system, however, used pins on a rotating wheel to actuate the movement of a rotating gear and cause a solenoid system to operate. Likewise, in U.S. Pat. No. 2,246,694 pins on a rotating wheel were used to engage a lever which moved a floating gear into position to actuate an automatic interval timer, but the system had no long range programming available since one cycle went through all the pins on the rotating wheel. In and of itself, the actuating of solenoid valves in sequential timing by placing them around a rotating wheel is not new. In U.S. Pat. No. 2,905,394 sequential programming of sprinkler heads was made available simply by having the switches placed around a rotating, synchronized, clock-timed gear. In U.S. Pat. No. 3,599,867 a sprinkling system was disclosed with its own control, however, the control referred to in FIG. 3 of the drawings was a most impressively massive control unit. It required literally dozens of switches, circuits, and timing zone control units to effectuate sequential timing. The mechanism of this invention has accomplished the same result with a few pieces, put together very simply, and designed in a new and unique manner. Likewise, in U.S. Pat. No. 3,780,766 the programming of timing was accomplished, but the complexity of the arrrangement was incredible and required at least two other independent systems, each to be independent and actually provided no new range sequential program in design. Further developments such as the placing of activatable devices around a rotating cam or pawls to provide new and novel devices such as is shown in U.S. Pat. No. 3,063,643. However, again no long range programming was available in that design and the complexity of the electrical system required was far more complex than the new and novel apparatus of this invention. The simple placing of pins on a pawl to be rotated with a cam arrangement to kick on an actuating device was shown in water softner valve units in U.S. Pat. No. 3,480,041, but here again no long range programming of a sequential nature was possible other than for the most simple types of programs. Likewise, the same approach was adapted in U.S. Pat. No. 3,000,398 for water sprinkling systems, but here again no long range desirable programming of the nature described in the present invention was made known. Other advances in the area include that disclosed in U.S. Pat. No 3,708,068 where a simple system made of an acutator keying on pins of a rotating wheel was disclosed, but this was simply a yes or no type approach with each way requiring complexity in attempting to adjust the timing within the day. British Specification No. 886,606 has a very complex system which may have been adaptable to the previous device to make a better system, but the complexity of the adaptability would have been so great that it would have had no advantages when compared to the simple device presented herein. While some prior designs of devices are found in washing machine controls, especially the automatic type washing machine, these apparatus have generally been so complex and bulky as to not be adaptable in water sprinkling devices wherein minaturization is of importance. In U.S. Pat. No. 3,140,720, a very excellent lawn sprinkling system is disclosed but here again the complexity of the control system is so extensive that the expense be prohibitive for a low cost system. The new and novel invention disclosed herein accomplishes the same result in a very simple device of far less cost. Likewise, almost all of the other types of systems would not be adaptable in water sprinkling devices wherein miniaturization is of key importance. In U.S. Pat. No. 3,140,720 a very excellent lawn sprinkling system is disclosed, but here again the complexity of the controlled system is so extensive that the expense may be prohibitive for a low cost system. The new and novel invention disclosed herein accomplishes the same result in a very simple device of far less cost. Likewise, a good proportioning system disclosed in U.S. Pat. No. 3,249,115 is an excellent distribution system but the complexity of the system far exceeds the advantages presented thereby. Additionally, U.S. Pat. No. 3,669,352 showed a device with pins on a rotating wheel actuating solenoids to activate a lawn sprinkling system but here again each zone or control had to be actuated manually by switches thereon. The new and novel device of this invention overcomes the shortcomings of having to have each system independently programmed. A very excellent water distribution system relying heavily upon mechanical apparatus to activate electrical circuits is disclosed in U.S. Pat. No. 2,318,969, but here again the complexity of the electrical system required to accomplish the goal was so extensive as to make the system prohibitively expensive. Much of the problems of that device may have been overcome in U.S. Pat. No. 2,986,167. The mechanical complexity of that device was again so complex that the expense overcame any advantages presented thereby. In the same fashion, U.S. Pat. Nos. 3,742,768 -

3,426,603 - 3,670,893 - 1,574,861 and the related patents each show timing devices which are acceptable and sufficient for providing the end result but which are, nevertheless, so complex in either mechanical or electrical design as to be expensive in preparation and therefore prohibitive for use in simple devices.

The new and novel timing device of this invention overcomes all the problems and difficulties associated with prior known timing devices. The system herein presented is fully automatic, is low cost in construction, and is economical to an extent never before achieved in the industry. In addition to being the lowest cost available timing device to provide all the necessary functions, the system is far more foolproof and less subject to damage than any other prior known system.

SUMMARY OF THE INVENTION

It is an object of this invention to provide a mechanism capable of performing the dual functions of a clock to supply timing function in an automatic timing device, and to supply adequate power to drive a valve associated therewith.

It is the further object of this invention to provide an automatic timing device which is low cost and economical to produce.

It is the further object of this invention to provide an automatic timing device that is simple to set and is not subject to damage due to gear jamming.

It is a still further object of this invention to provide an automatic timing device which is easy to initiate manually in addition to its automatic initiation.

The objects of this invention are accomplished by an automatic timing device adapted for turning on and off a valve of an automatic system and being adapted to be programmed for automatic operation over an extended period of time, said device comprising:

a. a base;
b. a first shaft mounted on said base;
c. a second shaft mounted on said base spaced apart from and substantially parallel to said first shaft,
d. a first circular gear rotatably mounted on said first shaft;
e. a second circular gear rotatably mounted on said common shaft above said first circular gear and normally independently rotatable with respect to first gear, said second circular gear having an upper portion thereof defining a circular peripheral cam surface having a detent recess at a portion thereof defining a terminal detent position;
f. a first elongate slide lever having an elongate slot at one end and having said first shaft disposed therein, and an elongate slot at the other end having said second shaft disposed therein, said first slide lever having a stud affixed thereto extending downwardly and disposed in an elongate slot provided in said base, and a pinion gear rotatably mounted on said stud, and spring means biasing said first slide lever toward said first shaft;
g. a second elongate slide lever slidably mounted over said first slide lever having an elongate slot at one end having said first shaft disposed therein and an elongate slot at the other end having said second shaft disposed therein, a stud affixed at one end of said second slide lever engaging the cam surface of said second circular gear, a timing gear-engaging flange directed upwardly at one end of said second slide lever and a calendar wheel pin-engaging means at another portion of said second slide lever, said first and second slide levers being spring-biased in a longitudinal direction away from each other and both being movable longitudinally with respect to said first and second shafts;
h. a circular timing gear rotatably mounted on said second shaft having an axially extending rim defining a pawl chamber, a pawl mounted therein having an outwardly spring-loaded pawl tooth extending through a recess in said rim and adapted to retract upon application of force thereto, a pin mounted near the periphery of said timing gear extending downwardly and adapted to engage the timing gear pin-engaging flange of said second slide lever;
i. a calendar gear wheel rotatably mounted on said first shaft having a plurality of ratchet teeth provided at the periphery thereof and a plurality of pins slidably mounted in apertures provided in said wheel adapted to be alternatively placed in upwardly oriented inoperational position or in downwardly oriented operational position;
j. a motor mounted on said base having speed reduction means terminating in an output pinion gear positioned in gear engagement with said first circular gear;
k. reduction gear means mounted on said base having a larger circular gear engaging said output pinion gear and having coaxially and upwardly mounted a pinion gear of smaller radius than said larger circular gear, said pinion gear being operatively engaged with said timing gear, and;
l. a valve-operating circular gear having a shaft affixed at the center thereof rotatably journaled in said base, said shaft being adapted to engage and operate a valve, whereby when said motor operates through said output pinion and rotates said reduction gear means and causes said circular timing gear to rotate, said pawl tooth engages a ratchet tooth of said calendar wheel and rotates it, thereby causing a calendar wheel pin in the operable position to engage the pin-engaging means of said second slide lever and to move said slide lever longitudinally thereby placing said timing gear pin-engaging flange in engagable postion, the timing gear pin thereby engaging said flange and moving said second slide further until the stud thereof leaves said detent recess and rides on the circular cam surface of said second gear and causing said first slide-supported pinion gear to move into engagement with both said first and said second circular gears, causing said second circular gear to rotate until it has made a full revolution, said second circular gear engaging and rotating said valve operating gear and thereby rotating said valve operating gear shaft to cause a valve connected thereto to be opened and closed during rotation, whereupon at the end of the revolution of said second gear said stud riding on said cam surface once more enters said detent recess, thereby disengaging said second circular gear from said first circular gear.

In a preferred embodiment of the above described timer device the second shaft is slidable axially and is spring-biased toward the base plate, and the timing gear is fixed axially with respect to the shaft, and may be lifted upwardly and disengaged from the timing wheel operating pinion for indexing the timing wheel to a different time. Also, preferably, the timing dial is mounted over the timing gear and adjustably affixed by a dial knob. Additionally, it is preferred to have an eclipse cam disc having the same cam surface as the cam mounted on the same shaft over the cam portion and spring-loaded in an eclipsing position. Additionally, it is preferred to have a first shaft provided with a shoulder for supporting the first slide lever. Still further, in addition, is preferred that the calendar wheel be so arranged with respect to the axially extending rim of the timing gear that the rim normally restrains rotation of the calendar wheel, and that when the pawl tooth engages one of the ratched teeth of the calendar wheel, the pawl tooth is forced inwardly and the ratchet tooth of the calendar wheel enters the recess in the axial rim of the timing wheel and clears as the timing and calemdar wheel rotate in engagement until the pawl tooth passes and the calendar wheel is one again restrained rotationally. Another embodiment includes that in which the calendar gear wheel pins are provided with detents in both the operational and inoperational positions and that embodiment wherein the first circular gear and the second circular gear and the valve operating gear all have the same diameter and the same number of teeth. It is preferred to have the timing dial graduated in terms of hours of the day and the calendar wheel gear to have a dial face graduated in days of the week.

Still other objects will readily present themselves to one skilled in the art upon reference to the following specification, the drawings and the claims.

BRIEF DESCRIPTION OF THE DRAWINGS

This invention may be more fully described, but is not limited by the attached drawings wherein.

Figure 1:
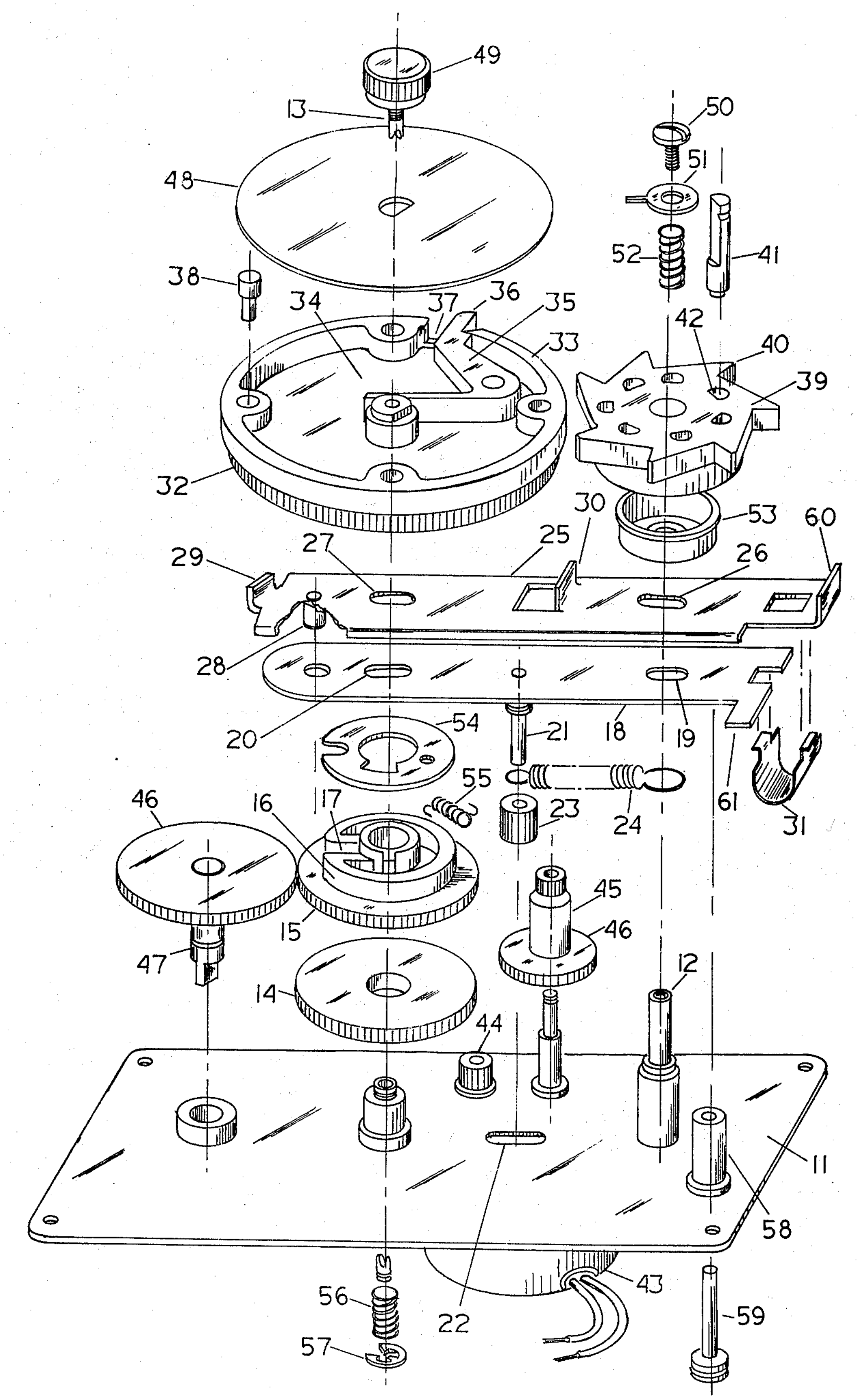
FIG. 1 is an assembly drawing of a timing device according to this invention.
Figure 2:
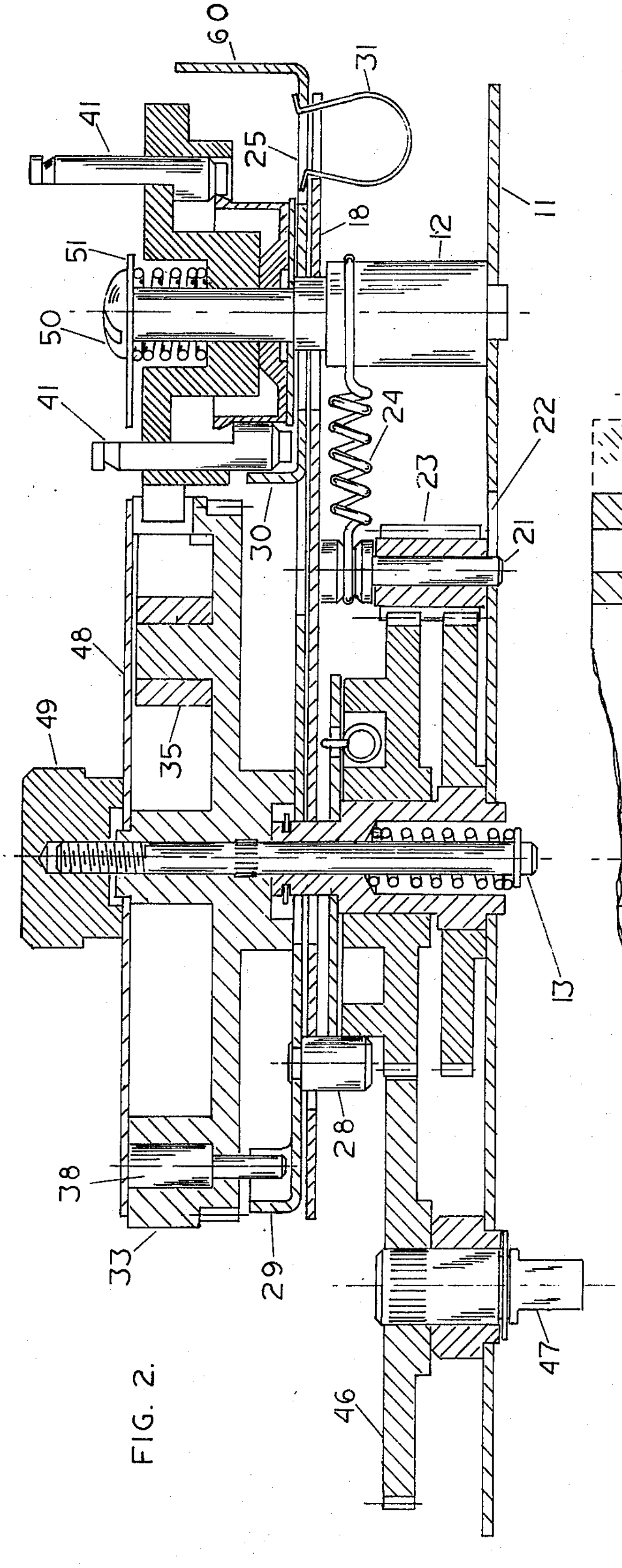
FIGS. 2 and 3 are cross-sectional views of the timing device according to this invention.

In the drawings, a face 11 has a first shaft 12 mounted therein. A second shaft 13 is mounted on the base and spaced apart from and substantially parallel to the first shaft 12. A first circular gear 14 is rotatably mounted on the first shaft and preferably, in operation, makes a revolution every three hours. A second circular gear 15 is rotatably mounted on the common shaft 13 above the first circular gear 14 and is normally independently rotatable with respect to the first gear 14, and the second circular gear 15 has an upper portion thereof 16 defining a circular peripheral cam surface 16 having a detent recess 17 at a portion thereof defining a terminal detent position. A first elongate slide lever 18 has an elongate slot 19 at one end with the first shaft 12 disposed therein and an elongate slot 20 on the other end with the second shaft 13 disposed therein. The first slide lever 18 has a stud 21 affixed thereto extending downwardly and disposed in an elongate slot 22 in the base. A pinion gear 23 is rotatably mounted on the stud 21 and a spring 24 biases the first slide lever toward the fist shaft. A second elongate slide lever 25 is slidably mounted over the first slide lever 18 and has an elongate slot 26 at one end with the first shaft 12 disposed therein and an elongate slot 27 at the other end having the second shaft 13 disposed therein. The stud 28 is affixed at one end of the second slide lever and engages the cam surface of a second circular gear. A timing gear-engaging flange 29 is directed upwardly at one end of the second slide lever and a calendar wheel pin-engaging means 30 is at another portion of a second slide lever. The first and second slide levers are spring-biased by spring 31 in a longitudinal direction away from each other and both are movable longitudinally with respect to the first and second shafts. A circular timing gear 32 is mounted on the second shaft and has an axially extending rim 33 defining a pawl chamber 34. A pawl 35 is mounted therein having an outwardly spring-loaded pawl tooth 36 extending through a recess 37 and the rim and adapted to retract upon application of force thereto. A pin 38 is mounted near the periphery of the timing gear and extends downwardly and is adapted to engage the timing gear pin-engaging flange of the second slide lever. A calendar wheel 39 is rotatably mounted on the first shaft 12 and has a plurality of ratchet teeth 40 provided at the periphery thereof and a plurality of pins 41 slidably mounted in aperatures 42 provided in the wheel and adapted to be alternatively placed in the upwardly oriented inoperational position or in the downwardly oriented operational position. A motor 43 is mounted on the base 11 and has speed reduction means terminating in an output pinion gear 44 positioned in gear engagement with the first circular gear 14. A reduction gear means 45 is mounted on the base and has a larger circular gear 46 engaging the output pinion gear and has coaxially and upwardly mounted a pinion gear of smaller radius 23 than the larger circular gear with the pinion gear being operatively engaged with the timing gear. A valve-operating circular gear 46 has a shaft 47 affixed at the center thereof and rotatably journaled in the base, with the shaft being adapted to engage and operate a valve. A calibrated timing dial 48 is above the circular timing gear on the second shaft 13 and is secured thereto by a dial knob 49. A screw 50 attaches the calendar wheel to the first shaft and has an indicator 51 thereon with a spring 52 securing it in position and a spacer 53 keeping the calendar wheel a sufficient distance from the second elongate slide lever 25. Preferably an eclipse cam disc 54 sits on the second shaft above the second circular gear 15 and is spring-loaded thereto by spring 55.

In order to interrupt the cycle, a lock-out bushing 58 can be provided in the base with a lock-out pin 59 slidable therein to engage lock-out ear 61 on the first elongate slide lever to prevent it from moving and initiating the cycle.

Figure 6:
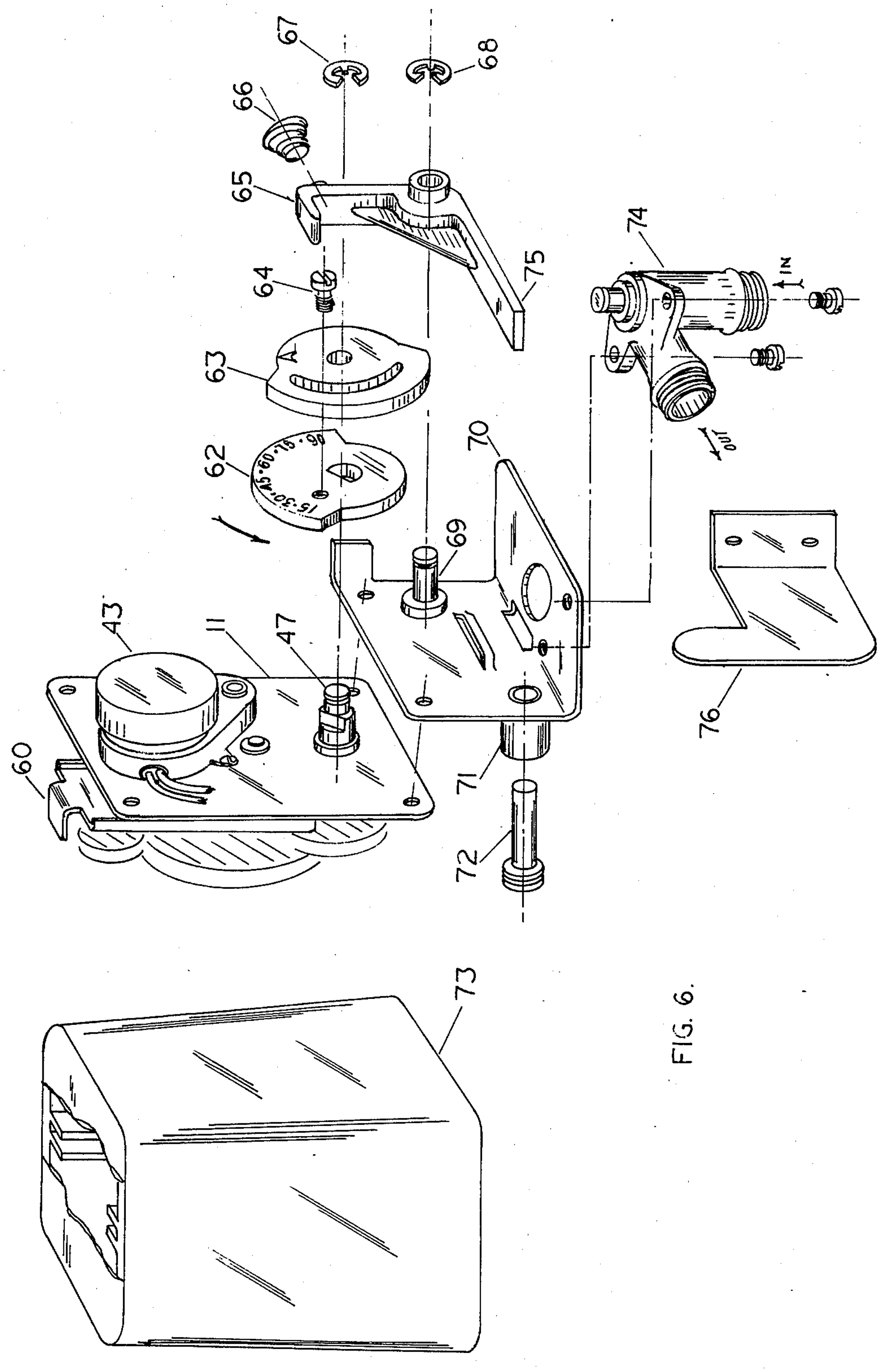
FIG. 6 is an assembly view of the timing device of this invention showing its attachment to a lawn sprinkler.

Referring now to FIG. 6, the timing device is shown with output shaft 47 on the back thereof. A fixed cam 62 is attached to the output shaft and has indicia in minutes of time of valve on. An adjustable cam 63 is mounted behind the fixed cam and has a lock screw 63 for setting the time of cycle. Mere loosening of the screw and setting of the arrow to the cycle time accomplishes the desired result. An actuating lever 65 rides the cam and pivots on pivot pin 69 which is attached to second base 70. Retaining rings 67 and 68 secure the indicated members to the indicated shafts. Lever 65 terminates in actuating arm 75 which, when pressed, opens valve 74 allowing water to travel from a source to a destination. A lock-out bushing 71 holds a lock-out pin 72 which can slide against the arm 75 to prevent opening of the valve when lock-out is desired. The entire system can be mounted on the wall by use of wall mounting bracket 76 and covered by hood 73 which can slide over the sides the base 11.

Figure 7:
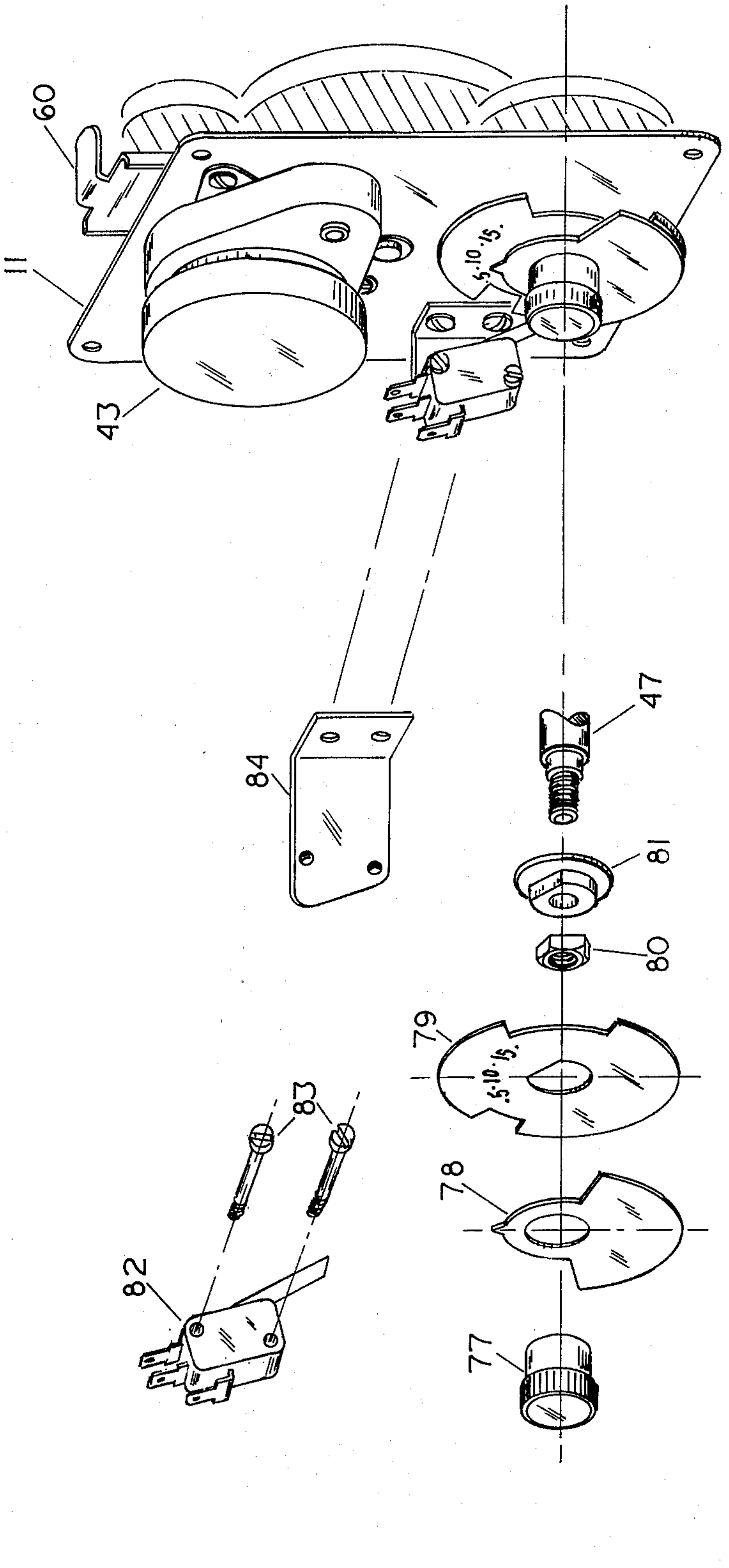
FIG. 7 is a perspective view of the timing device of this invention using an electrical rather than a mechanical take-off.

Referring now to FIG. 7, an electrical take-off is illustrated. Output shaft 47 is modified with a screw on end. A cam bushing 81 is placed over the shaft and provides a key for cam 79. The cam bushing is held on the shaft by nut 80. A fixed cam 79 has gaps therein for the desired timing and indicia thereon to indicate the desired timing. An adjustable can 78 is designed to give the desired timing and has an arrow or pointer for setting. It is held in place by knob 77 which can be loosened to adjust timing. A switch-holding bracket 84 is attached to the back of the base and switch-holding screws 83 hold switch 82 in place. The switch is a commercially available, single pole, double throw switch. When set, the rotation of the cams and their appropriate design enables the electrical switch to be programmed at will. This design is an inexpensive construction and provides the benefits of having the cams removable in the field for reprogramming. It is simple and fully adjustable.

In the timing device of this invention, a 7 day or 8 day wheel can be used and can thus provide for alternating the day of the week of functioning, an achievement normally obtained only by devices having a 14 day skipper.

The lock-out pin used in the timing device of this invention can be used for vacation schedules, or, in the case of water softeners, be tied into a hardness indicator, or, in the case of lawn sprinklers, be tied into an automatic moisture indicator.

Figure 3:
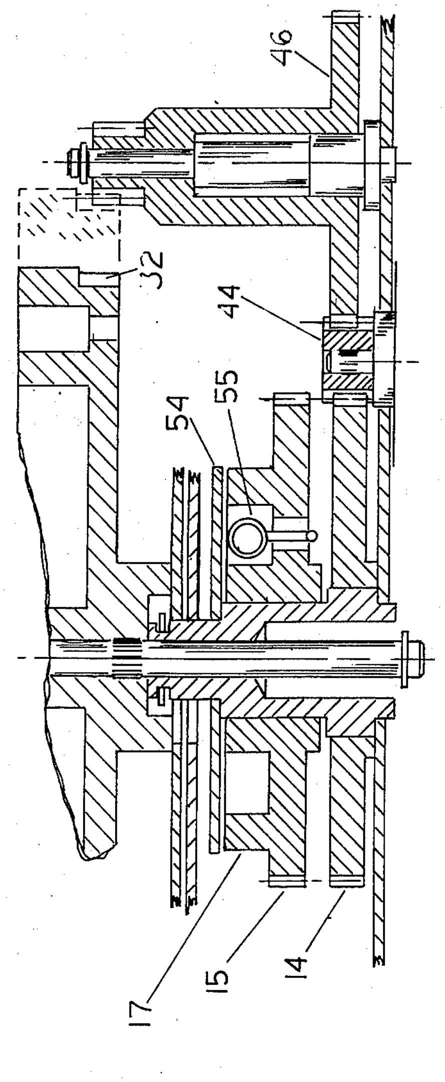
Figure 4:
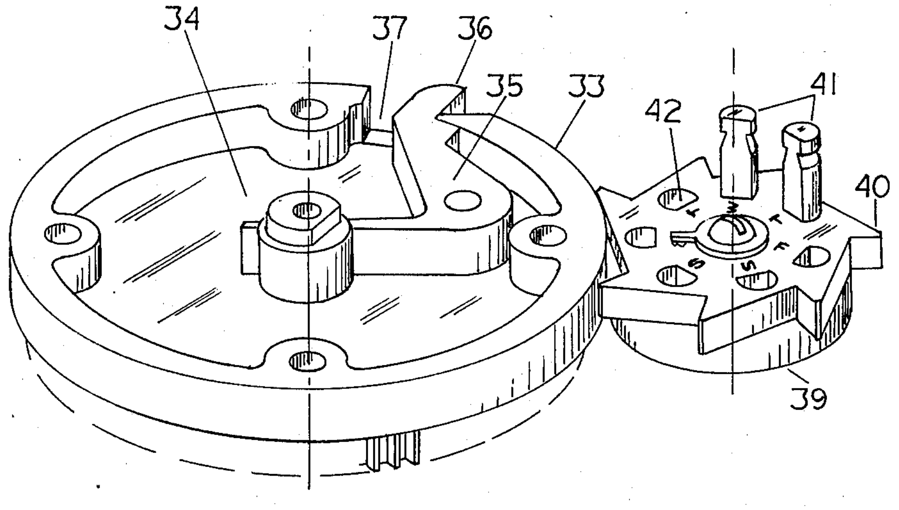
FIG. 4 is a perspective view of the circular timing gear, pawl, and calendar gear wheel approaching engagement.
Figure 5:
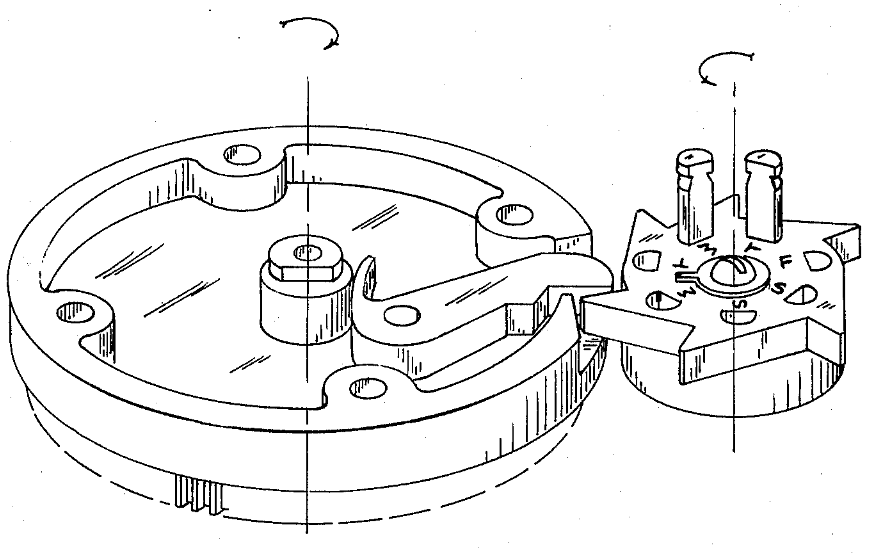
FIG. 5 is the embodiment of FIG. 4 rotated into engagement position.

When the motor 43 operates through the output pinion gear 44 and rotates the reduction gear means 45 causing the circular timing gear 32 to rotate, the pawl tooth 36 engages a ratchet tooth 40 of the calendar wheel 39 rotating it and causing a calendar wheel pin 41 in the operable position to engage the pin-engaging means of the second slide lever and move the second slide lever 25 longitudinally thereby placing the timing gear pin-engaging flange 29 in engageable position. The timing gear pin 38 then engages the flange 29 and moves it until the slide stud 28 leaves the detent recess 17 and rides on the circular cam 16 of the second gear 15 causing the first slide supported pinion gear 23 into engagement with both the first and second circular gears and causing the second circular gear 15 to rotate until it has made a full revolution. The second circular gear then engages and rotates the valve-operating gear 46 thereby rotating the valve-operating gear shaft to cause a valve connected thereto to be opened and closed during rotation. At the end of the revolution of the second gear, the stud 28 riding on the cam surface once more enters the detent recess 17 thereby disengaging the second circular gear 15 from the first circular gear. In the embodiment shown, the second shaft 13 is slidable axially, and is spring-biased toward the base plate by spring 56, appropriately held on the shaft by a lock device such as lock 57. In such an arrangement, the timing gear is fixed axially with respect to the shaft and may be lifted upwardly and disengaged from the timing wheel operating pinion for indexing the timing wheel to a different time. A timing dial 48 is mounted over the timing gear and is adjustably affixed by a dial knob 49 with the calibrated timing dial preferably having two 12 hour indexes, one for the A.M. and one for the P.M. The eclipse cam disc 54, with the same cam surface as the cam, is mounted over the shaft and spring-loaded by the spring 55 into an eclipsing position. Preferably the first shaft is provided with a shoulder for supporting the first slide lever. It is also preferred that the calendar wheel be arranged with respect to the axially extending rim of the timing gear so that the rim normally restrains motion of the calendar wheel and that when the pawl tooth engages one of the ratchet teeth of the calendar wheel, the pawl tooth is forced inwardly and the ratchet tooth of the calendar wheel enters the recess in the axial rim of the timing wheel and clears as the timing wheel and calendar wheel rotate in engagement until the pawl tooth passes and the calendar wheel is once again restrained rotationally. This is fully explained with respect to FIG. 3 and FIG. 4, showing the revolution and the operation. It must be understood that in such an arrangement the pawl tooth assembly must be of such a material that will allow it to be springy and effect the action required. It is preferred to have the calendar wheel pins provided with detents in both the operational and inoperational positions. It is also preferred for the first circular gear and the second circular gear and the valve-operating gear to all have the same diameter and the same number of teeth. It is preferred that the timing dial be graduated in terms of hour of the day, and the calendar gear wheel have the face thereof graduated in days of the week.

DESCRIPTION OF THE PREFERRED EMBODIMENTS

The preferred embodiment of this invention is that as illustrated in the attached drawings. Generally it consists of a base plate 11 which provides a method for mounting on the valve which is to be turned. The base plate has a synchronous timing motor 43 which rotates the output pinion 44 in the clock-wise direction at one revolution in 30 minutes. This, in turn, drives the reduction gear and pinion 45 in a counterclockwise direction, which in turn drives a timing gear 32 at a speed of one revolution in 24 hours. The timing gear 32 is calibrated by dial 48 which, preferably, is two 12 hours indexes of A.M. and P.M. for setting to the correct time of day. The timing gear also indexes the calendar wheel to the pawl 35 once every 24 hours at approximately 12 P.M. that is the desired time of initiation. The timer can be constructed with either the calendar gear wheel 39 being a 7 day wheel for weekly programming or a 6 day wheel for operation in sequence of every day, every second day, every third day, or every sixth day. The wheel has push-pull pins 41 that are detented in the up and down positions. The up position will omit the function of the timer, while the down position will institute the program of the timer. The slide levers are scissored together by the spring 31 and the slots of both parts. The entire assembly is then biased toward the first shaft by spring 24 and the bias spring has a very light tension in comparision to the scissor spring. The output pinion of the motor is also meshed with the first circular gear and is driven at a constant rate of one revolution in 3 hours. Coaxially mounted above the first circular gear is the second circular gear which is normally stationary. This is meshed in turn with the valve operating circular gear 46 with has its shaft extending to the rear of the plate to provide means for coupling to a valve. Preferably, the first circular gear, the second circular gear, and the valve-operating circular gear each have the same diameter and the same number of teeth. The second circular gear has an integrally molded cam and an eclipse cam disc 54 which is spring-loaded in a counterclockwise direction by spring 55. The levers each have a stud staked to their individual assemblies. The first elongate slide lever has a stud that provides the anchor for the spring 24 and which is also the axle for the first shaft 12 which in its normal position is in a free-floating manner. The stud is also guided by a support slot in the base plate. The second elongate slide lever has a stud that rides on the cam of the second circular gear and provides a zero index for the valve output gear 46 and maintaing the mesh of gears.

To initiate the valve cycle as the timing gear 32 advances and indexes the calendar gear wheel 39, the next pin 41 approaching the center line of the timer, if in the down position, will engage the ear in the middle of the second elongate slide lever and move the lever just far enough to place the ear on the other side of the lever into the path of the approaching pin 38. This pin is usually assembled in the time dial or timing gear in a position so that the operation will occur at 2:30 A.M. when water usage is at a minimum. However, other holes are provided to change the time at the users option. As pin 38 engages the lever 29, it continues to move both levers until the pinion gear 23 begins to engage with the first and second circular gears. The pinion gear has two individual diameters to its gear teeth with the pinion engaging with the first circular gear which is constantly rotating, being several thousanths of an inch larger, so that it will engage and rotate with its gear prior to engagement with a second circular gear which is stationary. Should any misalignment occur, the first elongate slide lever has the capability to resist a jamming action, and being spring-loaded to the second slide lever, will prevent damage to the teeth by forceable entry. As the first circular gear rotates the second circular gear, it causes the stud 28 on the second elongate slide lever to ride up and rise on to the periphery of the cam surface, holding the gear system into mesh. Prior to the end of the timed cycle, the pin 38 will depart from the ear of the second elongate slide lever and at the end of the cycle the stud 28 on the outside diameter of the cam will fall into the detent recess permitting both of the elongate slide levers to move the pinion 23 out of engagement with the gears.

Manual cycling at times other than automatic timing, is obtained by pushing the second elongate slide lever toward the second shaft by using flange 60. At the end of its travel it will allow the cam 16 to eclipse and the gears to engage thereby permitting one revolution wherein disengagement will occur. Addtionally, the pinion gear may be disengaged or prevented from entering engagement by latching it on the side of the elongate slide lever.

Setting of the timing device is as follows: Knob 49 is lifted and the calendar wheel 39 is rotated until the day of the week is under pointer or indicator 51. The knob is then rotated until the time of day on timing dial 48 faces indicator 51. The knob is then released and the pins 41 are depressed to give the desired days of operation.

It may thus be seen that this invention provides a significant advancement in the design of automatic timing devices. It is fullproof and economical to produce and operate. It is simple and avoids destruction normally occuring with jamming. It has unique features enabling easy manual override. There has yet to be produced a new and novel timing device of the magnitude of the one produced by this invention.

Having fully described this new and unique invention, the following is claimed:

1. An automatic timer device adapted for turning on and off a valve of an automatic system and being adapted to be programmed for automatic operation over an extended period of time, said device comprising:

a. a base;

b. a first shaft mounted on said base;

c. a second shaft mounted on said base spaced apart from and substantially parallel to said first shaft, d. a first circular gear rotatably mounted on said first shaft;

e. a second circular gear rotatably mounted on said common shaft above said first circular gear and normally independently rotatable with respect to first gear, said second circular gear having an upper portion thereof defining a circular peripheral cam surface having a detent recess at a portion thereof defining a terminal detent position;

f. a first elongate slide lever having an elongate slot at one end and having said first shaft disposed therein, and an elongate slot at the other end having said second shaft disposed therein, said first slide lever having a stud affixed thereto extending downwardly and disposed in an elongate slot provided in said base, and a pinion gear rotatably mounted on said stud, and spring means biasing said first slide lever toward said first shaft;

g. a second elongate slide lever slidably mounted over said first slide lever having an elongate slot at one end having said first shaft disposed therein and an elongate slot at the other end having said second shaft disposed therein, a stud affixed at one end of said second slide lever engaging the cam surface of said second circular gear, a timing gear-engaging flange directed upwardly at one end of said second slide lever and a calendar wheel pin-engaging means at another portion of said second slide lever, said first and second slide levers being spring-biased in a longitudinal direction away from each other and both being movable longitudinally with respect to said first and second shafts;

h. a circular timing gear rotatable mounted on said second shaft having an axially extending rim defining a pawl chamber, a pawl mounted therein having an outwardly spring-loaded pawl tooth extending through a recess in said rim and adapted to retract upon application of force thereto, a pin mounted near the periphery of said timing gear extending downwardly and adapted to engage the timing gear pin-engaging flange of said second slide lever;

i. a calendar gear wheel rotatably mounted on said first shaft having a plurality of ratchet teeth provided at the periphery thereof and a plurality of pins slidably mounted in apertures provided in said wheel adapted to be alternatively placed in upwardly oriented inoperational position or in downwardly oriented operational position;

j. a motor mounted on said base having speed reduction means terminating in an output pinion gear positioned in gear engagement with said first circular gear;

k. reduction gear means mounted on said base having a larger circular gear engaging said output pinion gear and having coaxially and upwardly mounted a pinion gear of smaller radius than said larger circular gear, said pinion gear being operatively engaged with said timing gear, and;

l. a valve-operating circular gear having a shaft affixed at the center thereof rotatably journaled in said base, said shaft being adapted to engage and operate a valve, whereby when said motor operates through said output pinion and rotates said reduction gear means and causes said circular timing gear to rotate, said pawl tooth engages a ratchet tooth of said calendar wheel and rotates it, thereby causing a calendar wheel pin in the operable position to engage the pin-engaging means of said second slide lever and to move said slide lever longitudinally thereby placing said timing gear pin-engaging flange in engageable postion, the timing gear pin thereby engaging said flange and moving said second slide further until the stud thereof leaves said detent recess and rides on the circular cam surface of said second gear and causing said first slide-supported pinion gear to move into engagement with both said first and said second circular gears, causing said second circular gear to rotate until it has made a full revolution, said second circular gear engaging and rotating said valve operating gear and thereby rotating said valve operating gear shaft to cause a valve connected thereto to be opened and closed during rotation, whereupon at the end of the revolution of said second gear said stud riding on said cam surface once more enters said detent recess, thereby disengaging said second circular gear from said first circular gear.

2. An automatic timer device according to claim 1, wherein said second shaft is slidable axially and is spring-biased toward said base plate, and whereby said timing gear is fixed axially with respect to said shaft and may be lifted upwardly and disengaged from said timing wheel operating pinion for indexing said timing wheel to a different time.

3. An automatic timer device according to claim 1, wherein a timing dial is mounted over said timing gear and adjustably affixed by a dial knob.

4. An automatic timer device according to claim 1, wherein an eclipse cam disc having the same cam surface as said cam is mounted on said shaft over said cam portion and spring-loaded in eclipsing position.

5. An automatic timer device according to claim 1, wherein said first shaft is provided with a shoulder for supporting said first slide lever.

6. An automatic timer device according to claim 1, wherein said calendar wheel is so arranged with respect to the axially extending rim of said timing gear that said rim normally restrains rotation of said calendar wheel, and that when said pawl tooth engages one of the ratchet teeth of said calendar wheel, said pawl tooth is forced inwardly and the ratchet tooth of said calendar wheel enters the recess in said axial rim of said timing wheel and clears as said timing wheel and calendar wheel rotate in engagement until said pawl tooth passes and said calendar wheel is once again restrained rotationally.

7. An automatic timer device according to claim 1, wherein said calendar gear wheel pins are provided with detents in both the operational and inoperational positions.

8. An automatic timer device according to claim 1, wherein said first circular gear, said second circular gear and said valve operating gear all have the same diameter and the same number of teeth.

9. An an automatic timer device according to claim 3, wherein said timing dial is graduated in terms of hours of the day.

10. An automatic timer device according to claim 1, wherein said calendar wheel gear has a dial face graduated in days of the week.

11. An automatic timer device according to claim 1 wherein the shaft affixed to the valve-operating circular gear has a cam thereon the rotation of which opens and closes a valve.

12. An automatic timer device according to claim 1 wherein the shaft affixed to the valve-operating circular gear has means affixed thereto for transmitting a timed electrical take-off in order to adapt the timer device to a need for a programmed, timed, electrical output.

* * * * *